Patented Apr. 16, 1935

1,997,614

UNITED STATES PATENT OFFICE 1,997,614

PROCESS OF MAKING REACTIVE RESIN COMPOSITIONS

Harold F. Wakefield, Newark, N. J., assignor to Bakelite Corporation, New York, N. Y., a corporation of Delaware No Drawing. Application February 11, 1928, Serial No. 253,783

4 Claims. (Cl. 260—4)

This invention relates to coating compositions such as varnishes, impregnating solutions, lacquers, enamels and the like, and more specifically to coating compositions of the general type described in United States Patent 1,590,079, patented June 22, 1926 to L. C. Byck; a primary object of the invention being to provide a process whereby reactive compositions of this type may be prepared in a direct and readily controllable manner.

According to the said patent a reaction is first effected between a phenol and a fatty oil in presence of a converting agent such as phosphoric acid, aluminum chlorid or the like, whereby the phenol and the oil enter into a combination therein termed a "phenol-oil composition". To this composition hexamethylenetetramine, formaldehyde or other methylene-containing hardening agent is added in one or two stages, in total quantity sufficient to impart to the mass a potentially reactive character. The resulting reactive mass dissolved in appropriate solvents yields films which retain their flexible character after a baking operation by which they are rendered infusible and highly resistant to solvents.

According to the present invention a phenol-oil composition is prepared substantially as described in the said patent, preferably by reacting on tung oil with phenol in presence of a small proportion, say 1 to 2 percent of phosphoric acid as a converting agent. Thereafter I add a water solution of formaldehyde or other methylene-containing hardening agent in proportion to impart the desired potentially reactive character, that is to say the methylene groups being in approximately equimolecular proportion to the phenol, although considerable latitude is allowable in this respect. In some cases I prefer to introduce additional phenol at this point, and in such event the amount of formaldehyde added should of course be correspondingly increased.

After addition of the methylene-containing compounds the mixture is refluxed or heated to react the methylenes with the phenol, i. e. the phenol-oil composition and the added phenol if any.

However, if it be attempted to react the mixture directly at this point, it tends to form an emulsion and foam, and when an attempt is made to remove the water, the mixture tends to gel and become stringy and unworkable before the water is completely evaporated.

According to the present invention I add, before the phenol-methylene reaction or during the early stages of this reaction, a medium or high-boiling solvent for the resin. I then heat the mixture to bring about the resin-forming reaction.

As such medium or high boiling solvent, which is to remain in the lacquer, I may use butanol (boiling point 114° C.), amyl alcohol (boiling point 137° C.), cello solve (ethylene glycol monoethyl ether), or other appropriate solvent. The essential characteristic of this solvent for the purposes of this invention is that it, for example butanol, will permit the resin-forming reaction, but restrain the troublesome emulsification and gelation. After the reaction has been carried as far as desired, the water may be removed by one of several methods which will keep the mass below the temperature of about 120° C. For example, there can be added toluene or other hydrocarbon capable of forming with water a constant boiling mixture boiling lower than 120° C. and lower than the solvent or its constant boiling mixture with water and evaporating the added hydrocarbon and water. The water may also be removed by vacuum distillation, the water being removed along with all or part of the added solvent. A third alternative, in the case where butanol is added, is to add such further amounts of butanol that, when the mixture is boiled, the water will be removed as a component of a constant boiling mixture with the butanol, leaving enough butanol behind to insure solution and liquidity of the resin. For example, by using butanol in the manner described, I have found it possible to drive off substantially all of the water at about 92° C. without danger of gelation. In case toluene is added, the water may be substantially removed leaving part, or substantially all of the butanol, again without danger of gelation of the resin. My invention includes broadly such solvent combinations as will accomplish this double function.

While my invention is especially applicable for the preparation of flexible varnish films, as particularly described herein, it is by no means limited to this particular use, but may be applied wherever water is to be eliminated from a resin composition of such high reactivity as to lead to difficulties of the kind above mentioned.

I claim:

1. In the process of making a reactive resin composition by reacting a phenolic body with a compound containing an active methylene group yielding a reaction product including water, and thereafter removing water from the resulting mass, the improvement which comprises reacting said body with said compound in the presence of a solvent of the group consisting of butanol, amyl alcohol and ethylene glycol monoethyl ether.

2. Process of making reactive resin compositions comprising reacting on a phenol-fatty oil composition with formaldehyde in presence of butanol; and eliminating water from the mass in the form of a constant-boiling mixture with toluene.

3. Process of making reactive resin compositions comprising reacting on a phenol-fatty oil composition with formaldehyde in presence of butanol; and eliminating water from the mass in the form of a constant-boiling mixture.

4. Process of making reactive resin compositions comprising reacting, in the presence of a member of the group consisting of butanol, amyl alcohol and ethylene glycol monoethyl ether, on a phenolic body with a compound containing an active methylene group, yielding a reaction product including water, and eliminating water from the resulting mass in the form of a constant-boiling mixture.

HAROLD F. WAKEFIELD.